United States Patent [19]

Hudson, Jr.

[11] 4,436,147

[45] Mar. 13, 1984

[54] DUAL FLUID HEAT EXCHANGER

[75] Inventor: Sharon J. Hudson, Jr., Lambertville, Mich.

[73] Assignee: Sharon Manufacturing Company, Lambertville, Mich.

[21] Appl. No.: 965,149

[22] Filed: Nov. 30, 1978

[51] Int. Cl.³ .......................... F28D 9/00; F28F 3/12
[52] U.S. Cl. .................................... 165/165; 165/164
[58] Field of Search ................ 165/164, 166, 165, 170

[56] References Cited

U.S. PATENT DOCUMENTS

| | | | |
|---|---|---|---|
| 2,511,084 | 6/1950 | Shaw | 165/166 |
| 3,399,720 | 9/1968 | Doelz et al. | 165/166 |
| 3,983,934 | 10/1976 | Lee | 165/170 |

Primary Examiner—Sheldon J. Richter
Attorney, Agent, or Firm—Harold F. Mensing

[57] ABSTRACT

A compact heat exchanger suitable for use in an automotive exhaust gas recirculation system. It has two interconnected elongated cooling chambers supported within a two piece outer casing. The fluid to be cooled enters the first cooling chamber at an intermediate location, flows towards opposite ends of the chamber then out of the first chamber into the ends of a second chamber through connecting passageways and finally towards an outlet located intermediate the ends of the second chamber. The cooling fluid enters the outer casing at one end flows over and along one side of the first chamber then through an aperture in a flange that divides the casing into two compartments. From this aperture it flows along and over both sides of the second chamber and one side of the first chamber to an outlet located at the same end as the coolant inlet. The component parts are designed to be assembled in a foolproof manner and copper brazed together with relative ease.

10 Claims, 5 Drawing Figures

DUAL FLUID HEAT EXCHANGER

SUMMARY OF THE INVENTION

Generally speaking this invention relates to a heat exchanger through which a fluid to be cooled and coolant fluid are circulated. More specifically the invention relates to a heat exchanger wherein the fluid to be cooled is a gas, i.e. automotive exhaust gas and the coolant fluid is a liquid, i.e. radiator fluid. The component parts are made of stainless steel and with the exception of the tubular components are made from sheet metal by stamping processes. The components are designed to interfit with one another so they can be preassembled into a unit in a foolproof manner with a copper brazing material contained therein and then passed through a brazing furnace to reliably produce hermetic seals.

The heat exchanger has an outer casing comprised of two shell sections joined together by a peripheral seam. A partition divides the interior into two coolant compartments which communicate with each other. The coolant fluid enters one of the compartments through an inlet and exits from the other compartment through an outlet. Within the casing there is an inner assembly having two chambers through which the exhaust gas is circulated. The exhaust gas enters one of the chambers at a central location from a direction normal to a primary cooling surface of that chamber then flows laterally towards opposite ends of the chamber, out through apertures adjacent to the ends of the chamber, into the other chamber and back towards a central location in the second chamber where an outlet aperture is located. Preferably the inner assembly is made of two pairs of plate members and the aforementioned partition is an integral part of one of the outside plate members so that only one of the plate members is exposed to the coolant in one compartment and three plate members are exposed to the coolant in the other compartment. The inlet for the exhaust gas is through the same shell member as the outlet for the coolant fluid and conversely the other shell member has the outlet for the exhaust gas and the inlet for the coolant fluid.

The invention as well as its objects and advantages will be understood best if the written descriptions is read with reference to the accompanying drawings which illustrate a preferred embodiment.

DETAILED DESCRIPTION OF THE INVENTION

Figure 3:
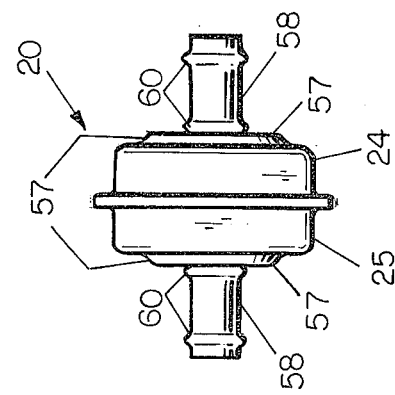
FIGS. 1, 2 and 3 are top, side and end views respectively of the heat exchanger.
Figure 2:
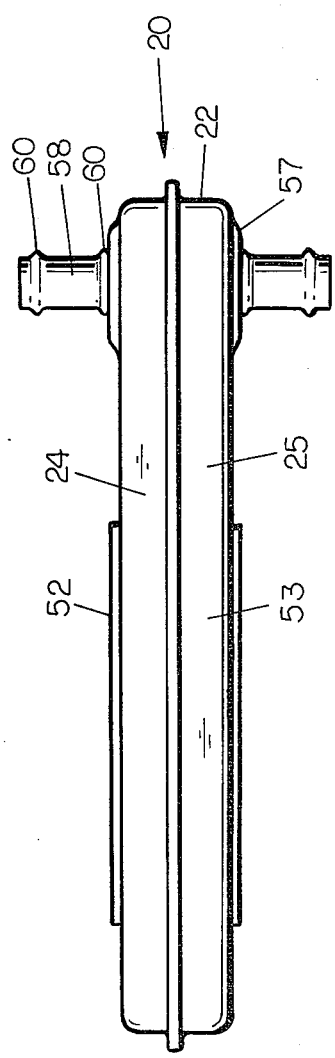
Figure 1:
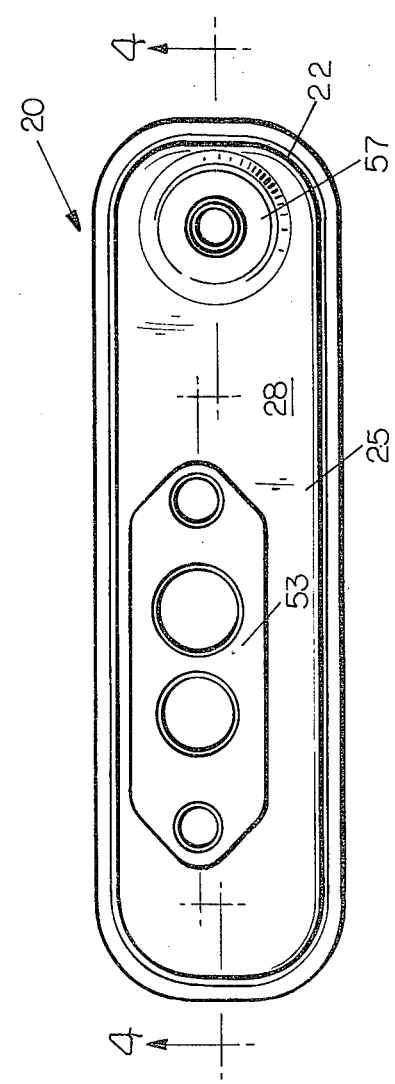
Figure 4:
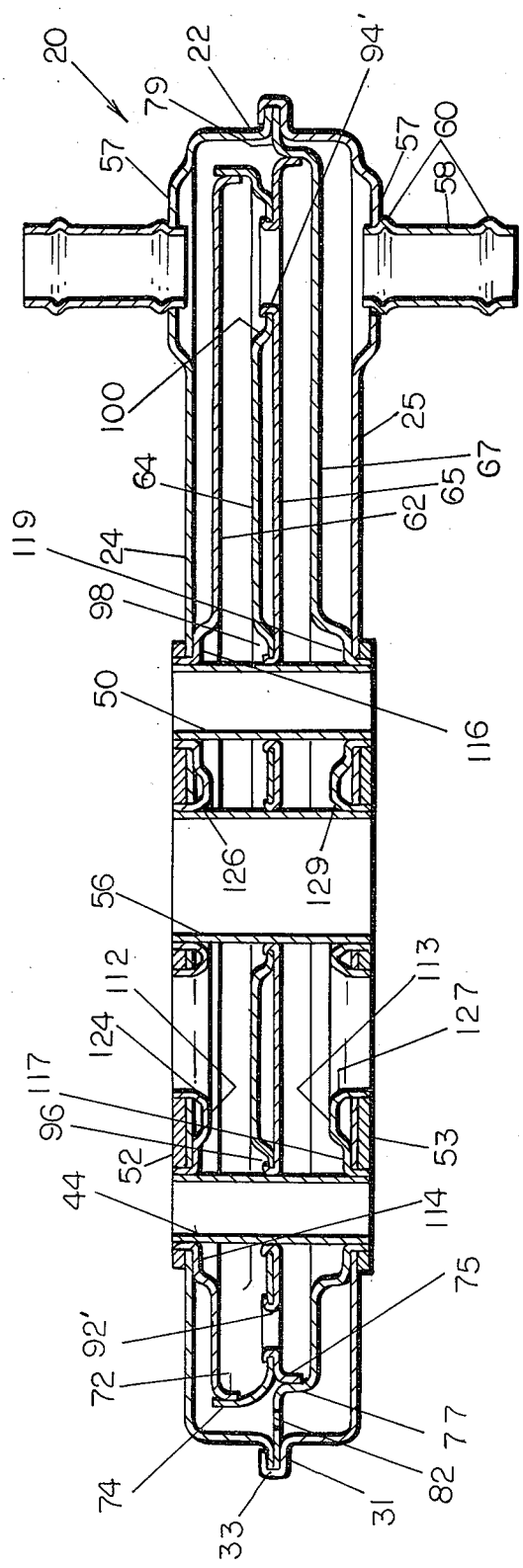
FIG. 4 is an enlarged sectional view taken along lines 4—4 of FIG. 1.
Figure 5:
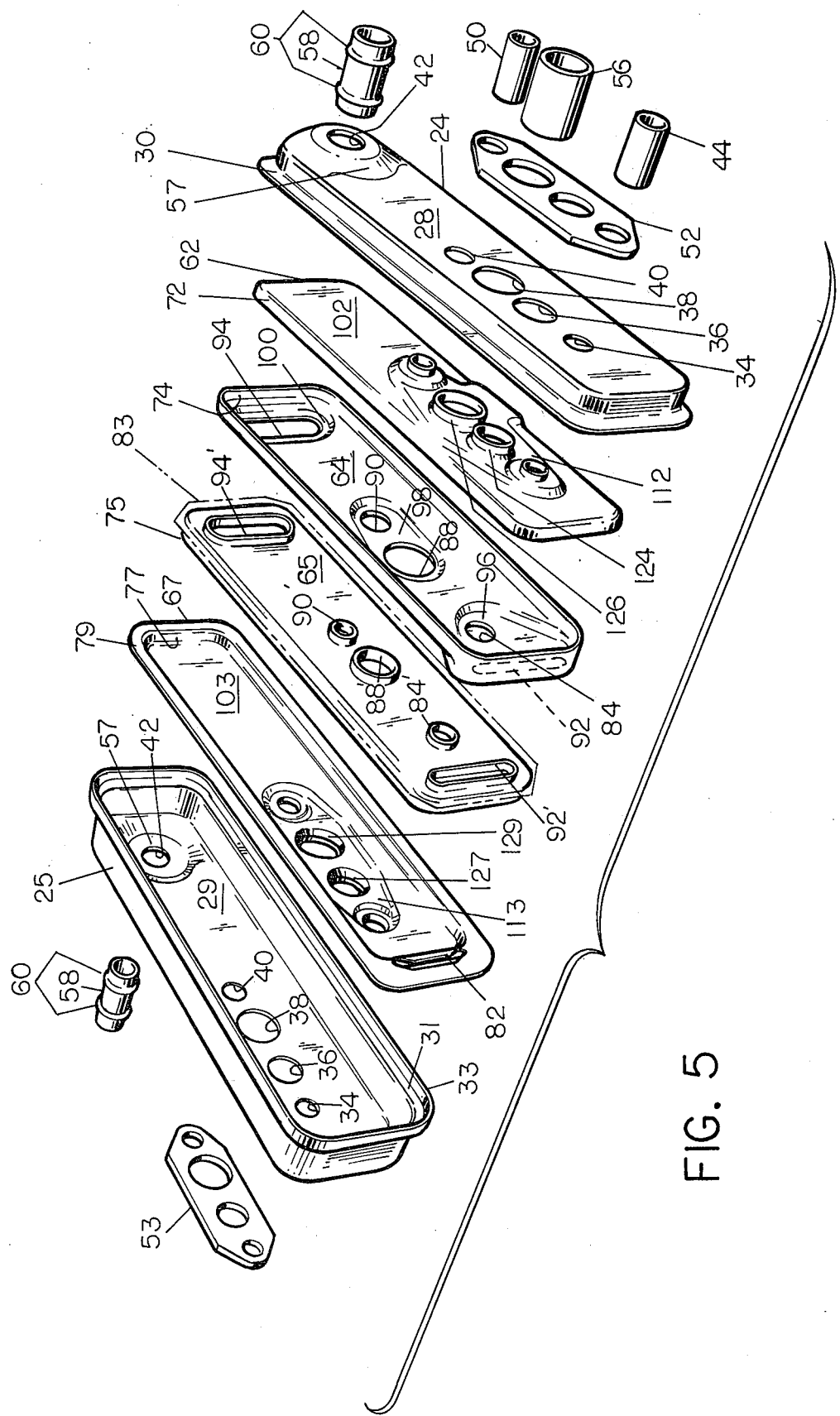
FIG. 5 is an exploded perspective view of the heat exchanger showing the details of the components parts.

The components of the dual fluid heat exchanger 20 include an outer casing for containing the cooling fluid and an interior plate assembly for the fluid to be cooled. Preferably the outer casing 22 is made of two stamped sheet metal shell sections 24 and 25 basically shaped the same as one another in the form of rectangular pans. Each shell section 24, 25 has a generally planar base panel 28, 29 with substantially perpendicular side and end walls and radiused corners. Planar peripheral flanges 30, 31 extend laterally outward from the wall edges of the shell sections 24, 25 respectfully. The peripheral flanges of one of the shell sections for instance flange 31 of shell section 25 has a lip 33 which is rolled back or crimped over the flange 30 of the opposite shell section 24 to mechanically lock the two shell sections together thus forming the outer casing 22.

A plurality of apertures are punched through the panels of the casing shell sections 24, 25. Preferably the apertures in the panels 28, 29 are symetrically arranged with respect to one another so that when the shell sections are assembled together the apertures in one panel are coaxially aligned with those of the other panel. Each panel 28, 29 has a group of four closely spaced apertures 34, 36, 38, 40 adjacent to one end and a remote aperture 42 adjacent to the opposite end. The apertures in the group are centered on a line extending parallel to the longitudinal centerline of the panel but spaced therefrom so as to be closer to one edge of the panel than the other. The two outer apertures 34, 40 of the group are of equal size but of smaller diameter than the two inner apertures 36, 38. Tubular sleeves 44, 50 extend between the respective apertures 34, 40 of each panel and terminate flush with the outer surface of panel reinforcing face plates 52, 53 which surround the group of apertures and are bonded to the respective panels. Sleeves 44, 50 accomodate a pair of mounting bolts or studs not shown for the heat exchanger. The pair of larger diameter central apertures 36, 38 involve the gaseous fluid flow passageways and are almost equal in size to one another. Aperture 38 nearest the center of the panel is slightly larger than aperture 36 and it contains a tubular sleeve 56 which extends between the panels and terminates flush with the outer surface of the reinforcing face plates 52, 53 so as to define a straight through passageway.

The remote aperture 42 of each panel 28, 29 is located in the center of a raised circular section or dome 57. One end of the short nipple 58 is fitted and sealed in the remote aperture 42 so that is coaxially aligned with another nipple 58 similarly fitted and sealed in the remote aperture 42 of the panel of the opposite casing shell section. The nipple 58 on one side of the casing is the inlet nipple and the nipple 58 on the other side is the outlet nipple. Outwardly protruding annular ribs 60 formed adjacent to the ends of the nipples 58 facilitate their connection to the panels and with the liquid coolant inlet and outlet hoses (not shown).

The interior plate assembly is comprised of four plate members 62, 64, 65, 67 which are mated together in pairs to form two superposed chambers for circulating the fluid to be cooled which in this instance is automotive engine exhaust gases. The four plate members have narrow peripheral sides 72, 74, 75, 77 respectfully upturned from the inside faces of their panels and are dimensioned so the sides of one member of a pair fit snugly inside the sides of its mate as shown in the drawings. For example the sides 74 of plate member 64 are on the outside of the sides 72 of its mating plate 62 and likewise sides 77 of plate member 67 are on the outside of sides 75 of mating plate 65. Also plate member 67, the outer plate member of its pair, has a laterally extending planar flange 79 integrally connected to the distal edge of its peripheral side 77. When the heat exchanger is assembled this lateral flange is sandwiched between flanges 30, 31 of the two shell sections of the casing so as to divide the interior of the casing into two compartments. The lateral flange 79 has an oblong aperture 82 across the end opposite from the casing end containing the coolant inlet and outlet nipples 58. This arrangement causes the coolant flowing into the casing through the inlet nipple 58 on shell section 25 to circulate in contact with the outer surface of plate member 67 along the bottom cooling chamber to the opposite end of the casing where it passes up through the oblong aperture 82 and then in a reverse direction in contact with the outer surfaces of the other plate member 65 of the bottom chamber and both plate members 62, 64 of the top chamber to the outlet nipple 58 in shell section 24.

During assembly the back to back plate members 64, 65 of the two chambers are mechanically locked together as a subassembly and preferably have a sheet of copper brazing foil 83 disposed between them. This copper sheet melts and flows to the adjacent seams and connections when the heat exchanger components are brazed together as a unit. Each of these plate members 64, 65 has three circular apertures 84, 88, 90 or 84′, 88′, 90′ respectfully which correspond to apertures 34, 38, 40 of shell members 24, 25. In addition they each have two oblong apertures 92, 94 or 92′ 94′. The oblong aperture 92 or 92′ located at the end opposite from the end containing nipple 58 is preferably about one half the size of oblong aperture 94 or 94′ located adjacent to the end containing nipple 58. Apertures 84′, 88′, 90′, 92′, 94′ in plate member 65 have extruded collars which extend through corresponding apertures 84, 88, 90, 92, 94 of plate member 64 and are expanded to lock the plates together. Preferably the collars for apertures 84′, 99′, and 90′, the apertures which contain the sleeves 44, 56 and 50 are of sufficient height prior to assembly to protrude above the far side of the adjacent plate 64 so they can be clinched or rolled over into contact with the far side of plate 64 during assembly. The height of the collars around oblong apertures 92′ and 94′ may be less than the height of the other collars provided it exceeds the thickness of plate 64 at least slightly, for example 0.010 of an inch, so that the top edges of the collars can be spread outwardly into tight contact with apertures 92,94. One of them for example plate 64 is provided with embossed or raised standoff sections 96, 98, 100 positioned at the ends and middle of the plate. They may be conveniently placed around one or more of the apertures as shown.

The panels 102, 103 of the outer plate 62, 67 respectfully of the interior assembly are similar in shape to each other in most aspects. They each have a raised section 112 or 113 which contains a group of apertures that correspond to shell aperture group 34, 36, 38, 40. The basic part of the raised section 112 or 113 extends above the outside of the panel 102 or 103 about ¼″ and its edges are generally about ¼″ outside of the group of apertures. The edges of the raised section 113 of panel 103 are parallel for a distance between the centers of the larger apertures. Beyond this distance the edges converge and ultimately merge tangentially with semi circular ends. One of the parallel edges runs closely adjacent to a panel edge whereas the opposite parallel edge of the raised section is spaced substantially away from the panel edge on its side. The outline of raised section 112 of panel 102 differs from the above configuration for raised section 113 in that the portion of its raised section corresponding to the spaced side has an extension which runs to the edge of panel 102 as shown in the drawings.

The ends of each raised section 112 or 113 have further raised annular spacers 114, 116, 117, 119 the faces of which abut against the inside surfaces of their respective casing shell sections. The larger central apertures of the group of each panel 102 or 103 have radiused or inwardly flared necks 124, 126, 127, 129 corresponding in height to the height of the annular spacers. Each aperture of the group of each panel has an extruded collar of sufficient height to extend through the casing to the outer surface of its respective reinforcing plate 52 or 53. The manner in which the adjoining components are formed and interfitted provides strength and integrity to the unit.

Although the invention has been described with reference to a preferred embodiment it is to be understood that various modifications will become apparent to those skilled in the art without departing from the scope of the invention which is defined by the claims.

I claim:

1. A heat exchanger made of sheet metal components comprising: an outer shell made of two shell members bonded together, a partition member in said outer shell defining two compartments for a circulating cooling fluid, an aperture in said partition member providing communication between said compartments, a fluid inlet to one of said compartments, a fluid outlet from the other of said compartments, two pairs of plate members defining two chambers of an inner assembly for a circulating fluid to be cooled, one of said plate members of one of said pairs being formed by said partition member said plate members being disposed such that one plate member is exposed to the circulating coolant in one compartment and the other plate members are exposed to the circulating coolant in the other compartment, a fluid inlet to one of said chambers, a fluid outlet from the other of said chambers and aperture means providing communication between said chambers.

2. A heat exchanger according to claim 1 wherein said compartment inlet opens into the compartment in which said one plate of said inner assembly is exposed to said coolant fluid.

3. A heat exchanger according to claim 1 wherein said outer shell is oblong in shape, both the fluid coolant inlet and the fluid coolant outlet are located adjacent to one end and the aperture in said partition is adjacent to the other end.

4. A heat exchanger according to claim 1 wherein said inner assembly is oblong in shape and said aperture means comprises apertures located adjacent to each opposite end to provide for flowage between the chambers at both ends of the inner assembly for the fluid to be cooled.

5. A heat exchanger according to claim 4 wherein said inlet and outlet for said fluid to be cooled are located intermediate the apertures of said inner assembly and spaced laterally therefrom.

6. A heat exchanger according to claim 1 wherein said outer shell members have peripheral flanges forming a seam and said partition comprises a peripheral flange on one of said plate members, said flange extending into said seam.

7. A heat exchanger according to claim 1 wherein the plate members of each pair of said inner assembly are joined together by means interfitting upstanding peripheral rims and with adjacent plates of said pairs being connected by means of collars extending from one member through apertures in an adjacent plate and expanded.

8. A heat exchanger according to claim 1 wherein said inner assembly has annular standoff means in abutment with inner surface portions of said outer shell.

9. A heat exchanger according to claim 1 wherein a plurality of tubular members extend through said outer shell and said inner assembly.

10. A heat exchanger according to claim 1 wherein said fluid inlets and outlets and said communicating apertures are disposed relative to one another such that the fluid coolant enters said outer shell at one end, flows to the other end of the first compartment then into the second compartment and back towards the opposite end of the outer shell to the outlet located in the same end as the inlet and the fluid to be cooled enters said outer shell and said inner assembly at an intermediate location, divides and flows in opposite directions to the ends of a first chamber of the inner assembly then into the ends of a second chamber to an intermediate position where it exits.

* * * * *